United States Patent [19]
Shari

[11] Patent Number: 6,068,661
[45] Date of Patent: May 30, 2000

[54] METHOD OF EMULATING SYNCHRONOUS COMMUNICATION

[75] Inventor: Srikumar N. Shari, Cupertino, Calif.

[73] Assignee: Micron Electronics, Inc., Nampa, Id.

[21] Appl. No.: 08/942,004

[22] Filed: Oct. 1, 1997

Related U.S. Application Data

[60] Provisional application No. 60/046,310, May 13, 1997.

[51] Int. Cl.[7] .................................................. G06F 9/455
[52] U.S. Cl. ............................... 703/27; 703/24; 703/25; 703/26; 709/101; 709/201; 709/220; 709/302
[58] Field of Search ............................. 395/500, 200.3, 395/680, 500.45, 500.46, 500.47, 500.48; 364/578; 709/101

[56] References Cited

U.S. PATENT DOCUMENTS

| | | | |
|---|---|---|---|
| 5,210,855 | 5/1993 | Bartol | 710/107 |
| 5,261,044 | 11/1993 | Dev et al. | 345/357 |
| 5,340,340 | 8/1994 | Hastings et al. | 439/64 |
| 5,471,617 | 11/1995 | Farrand et al. | 709/100 |
| 5,487,148 | 1/1996 | Komori et al. | 395/182.02 |
| 5,491,796 | 2/1996 | Wanderer et al. | 395/200.09 |
| 5,517,646 | 5/1996 | Piccirillo et al. | 713/1 |
| 5,555,510 | 9/1996 | Verseput et al. | 710/102 |
| 5,561,769 | 10/1996 | Kumar et al. | 395/200.05 |
| 5,576,946 | 11/1996 | Bender et al. | 364/146 |
| 5,579,491 | 11/1996 | Jeffries et al. | 710/103 |
| 5,581,712 | 12/1996 | Herrman | 710/103 |
| 5,651,006 | 7/1997 | Fujino et al. | 370/408 |
| 5,652,892 | 7/1997 | Ugajin | 395/750 |
| 5,655,081 | 8/1997 | Bonnell et al. | 395/200.32 |
| 5,671,441 | 9/1997 | Glassen et al. | 710/8 |
| 5,678,006 | 10/1997 | Valizadeh et al. | 395/200.02 |
| 5,678,042 | 10/1997 | Pisello et al. | 714/47 |
| 5,684,945 | 11/1997 | Chen et al. | 395/182.18 |
| 5,689,637 | 11/1997 | Johnson et al. | 395/182.22 |
| 5,696,486 | 12/1997 | Poliquin et al. | 340/506 |
| 5,710,908 | 1/1998 | Man | 395/500 |
| 5,745,897 | 4/1998 | Perkins et al. | 707/101 |
| 5,748,098 | 5/1998 | Grace | 340/825.16 |
| 5,751,575 | 5/1998 | Hirosawa et al. | 364/188 |
| 5,751,933 | 5/1998 | Dev et al. | 395/182.02 |
| 5,754,426 | 5/1998 | Dumais | 364/188 |
| 5,761,085 | 6/1998 | Giorgio | 702/333 |
| 5,761,429 | 6/1998 | Thompson | 395/200.54 |
| 5,764,911 | 6/1998 | Tezuka et al. | 395/200.53 |

(List continued on next page.)

OTHER PUBLICATIONS

"Serial Channel Synchronizer", IBM Technical Disclosure Bulletin, vol. 35, No. 2, pp. 69–74, Jul. 1992.

"Client Object Model for Distributed Servers", IBM Technical Disclosure Bulletin, vol. 39, No. 7, pp. 229–230, Jul. 1996.

PCI Bus Hot Plug Specification, Draft Revision 1.0, Dated Jun. 15, 1997.

Cowart, Mastering Windows 3.1 Special Edition, pp. 119 and 814, Copyright by Subex Inc., 1992.

Gavron & Moron, How to Use Microsoft Windows NT 4 Workstation, pp. 27, 35, 38, 39, 41, 49, and 155, Copyright by Macmillian Computer Publishing USA, 1996.

*Primary Examiner*—Kevin J. Teska
*Assistant Examiner*—Samuel Broda
*Attorney, Agent, or Firm*—Knobbe, Martens, Olson & Bear LLP

[57] ABSTRACT

The invention configures an asynchronous system to emulate a synchronous system. When an application initiates a synchronous transaction, the synchronous transaction is received by a synchronous interface. The synchronous interface, in turn, simulates a synchronous system while performing an asynchronous transaction. In one embodiment, the synchronous emulation ensures that the asynchronous transaction is completed within a configurable maximum time duration. If the asynchronous transaction has not been completed with within the defined maximum time duration, the synchronous emulation notifies the application that the desired data is not available. In another embodiment, the synchronous eumlation re-executes failed asynchronous transactions.

12 Claims, 5 Drawing Sheets

U.S. PATENT DOCUMENTS

| | | | |
|---|---|---|---|
| 5,764,913 | 6/1998 | Jancke et al. | 395/200.54 |
| 5,774,667 | 6/1998 | Garvey et al. | 395/200.52 |
| 5,781,798 | 7/1998 | Beatty et al. | 710/10 |
| 5,787,246 | 7/1998 | Lichtman et al. | 709/220 |
| 5,802,146 | 9/1998 | Dulman | 379/34 |
| 5,812,750 | 9/1998 | Dev et al. | 395/182.02 |
| 5,815,652 | 9/1998 | Ote et al. | 395/183.07 |
| 5,826,046 | 10/1998 | Nguyen et al. | 395/309 |
| 5,862,333 | 1/1999 | Graf | 395/200.53 |
| 5,901,304 | 5/1999 | Hwang et al. | 395/500 |
| 5,907,610 | 5/1999 | Onweller | 379/242 |
| 5,910,954 | 6/1999 | Bronstein et al. | 370/401 |
| 5,913,037 | 6/1999 | Spofford et al. | 395/200.56 |
| 5,922,051 | 7/1999 | Sidey | 709/223 |
| 5,944,782 | 8/1999 | Noble et al. | 709/202 |

METHOD OF EMULATING SYNCHRONOUS COMMUNICATION

RELATED APPLICATION

The subject matter of U.S. Patent Application entitled "Synchronous Communications Interface," filed on Oct. 1, 1997, application Ser. No. 08/943,344, and having attorney Docket No. MNFRAME.024A, is related to this application.

PRIORITY CLAIM

The benefit under 35 U.S.C. § 119 (e) of U.S. Provisional Application No. 60/046310, filed May 13, 1997 and entitled "High Performance Network Server System Management Interface," is hereby claimed.

TABLE

Table A, which forms a part of this disclosure, is a list of commonly owned copending U.S. patent applications. Each one of the applications listed in Table A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

The present invention relates generally to the field of computer communications. In particular, the present invention relates to an apparatus and method for performing synchronous operations in an asynchronous communications environment.

2. Background of the Invention

A plurality of linked computers, known as a network, is now commonplace in businesses and organizations. Such networks include Local Area Networks ("LAN") or Wide Area Networks ("WAN") which are interconnected with ethernet, twisted pair, fiber optics or token ring communications hardware.

Computers in such networks often interact by relying on what is called the client-server model. In the client-server model, communication takes the form of request-response pairs. Generally speaking, a program at one location sends a request to a program at another location and waits for a response. The requesting program is called the "client," and the program which responds to the request is called the "server."

One client-server communication system is the Simple Network Management Protocol ("the SNMP system"). In the SNMP system, each client transmits requests to, and receives responses from, one or more servers connected to the SNMP system. Each server processes its respective requests, and if needed, sends responses back to the clients. The requests and responses generated by the clients and servers are often generally referred to as network messages, network communications, data packets, and the like.

In the SNMP system, client requests are often sent asynchronously. That is, the requests are processed independently and not necessarily in the same order. For example, a particular server may process one request faster than another request. In addition, some servers may execute faster than other servers.

Another aspect of many asynchronous networking systems is that a client often continues to generate additional requests while awaiting the response to outstanding requests. For example, assume that a client generates a first request. While a server processes the first request, the client can continue to generate additional requests. Indeed, the number of outstanding requests is not limited, and can often exceed hundreds or thousands of requests.

Multiple outstanding requests in an asynchronous networking system significantly add to software development complexity. For example, when a client initiates multiple outstanding requests, the client must track the status of the requests. In some instances, due to server failure, a request may not be processed. In such instances, a new request may need to be generated.

In addition, when the client receives a response, the client must ensure that the response is matched with the corresponding request. For instance, a server may respond to the tenth request before responding to the first request. Thus, when the client receives the response, the client must match the response with the corresponding tenth request. As can be appreciated, the complexities of tracking requests can result in errors when a response is not properly matched with a corresponding request.

Another drawback of conventional asynchronous networking systems occurs when a client application attempts to display the responses to multiple requests. For example, assume that a user executes a program to monitor the operational status of different network components. Such a program is often called a system management application.

To display the operational status of different network components, the system management application may generate a number of asynchronous requests for information about the different network components. However, it is highly probable that the system administration application will receive the responses in a different order than the requests.

Consequently, the system administration application may begin to display the responses in a manner which confuses the user. For example, information about the tenth component might be displayed before information about the first component. When viewing this information, a user may in some cases, see data fields which contain partial information, or no information at all.

Thus, when a software developer designs a software application for an asynchronous networking system, the software developer must account for the unorderly processing of the asynchronous requests. Furthermore, the developer must track the status of each outstanding asynchronous request and ensure that each response is matched with its corresponding request.

It is well-acknowledged that the complexity of asynchronous networking systems increase the costs of developing new applications and enhancing existing applications. Furthermore, delays in delivering completed applications, continue to be a problem. When developing an application which relies on asynchronous communications, a developer can often encounter significant delays associated with debugging the intermittent errors which can occur when matching responses to requests.

As can be appreciated, highly trained software developers are needed to write application programs which are compatible with asynchronous networking systems. Such software developers are often in short supply, which further delays the development of new applications and increases costs.

The complexity, increased costs and need for trained software developers can discourage developers from designing and developing application programs for certain asynchronous networking systems. Indeed, the success or failure of a networking system can depend on the commitment of third parties to develop applications which are compatible with the networking system.

Thus, software developers need a product which reduces the complexity associated with developing application programs for asynchronous networking systems. For example, current SNMP systems do not provide a mechanism which frees software developers from the complexity of asynchronous communications. Consequently, current SNMP systems do not provide a mechanism which simplifies the generation of asynchronous requests, which ensures that the requests are managed correctly, and which also reduces the time and costs associated with developing new programs.

SUMMARY OF THE INVENTION

The present invention provides a method for a network communication module to simplify the operation of an application module by responding to a network communication request for data in a synchronous fashion when the standard tools provided to satisfy the request provide the data in an asynchronous fashion. One embodiment of the invention comprises accepting a network communication request for data from an application module and subsequently forwarding the network communication request for data to a library. The library then obtains the data from software on a server computer and stores the data in memory while the network communication module waits until the library has received all of the data from the software on the server before requesting that the data or a pointer to the data be provided to the network communication module. The network communication module then provides all of the data or a pointer to all of the data to the application module to thereby satisfy the network communication request for data.

BRIEF DESCRIPTION OF THE DRAWINGS

These and other aspects, advantages, and novel features of the invention will become apparent upon reading the following detailed description and upon reference to accompanying drawings in which.

DETAILED DESCRIPTION

To overcome the limitations of the prior art, one embodiment of the invention provides an unique synchronous interface which configures an asynchronous networking system to emulate a synchronous networking system. Thus, the unique synchronous interface makes an asynchronous system appear to operate like a synchronous system. As a result, software developers can design applications which are much simpler and easier to develop.

Unlike an asynchronous networking system, a synchronous networking system processes requests in an orderly fashion. For example, in many synchronous systems, after initiating a request, the client ceases execution until the server responds. When the client receives the response, the client may then initiate another request. Thus, each request is processed before execution of the next request.

For instance, assume that an application desires to send to a server, two requests to obtain two data values. In an asynchronous system, the client application may send both requests before receiving any responses. The responses are then received in any order.

In contrast, in a synchronous system, the application sends the first request for the first data value and waits for the response. After receiving the response, the client application then sends the second request for the second data value. Thus, in a synchronous system, an application does not need to monitor and manage multiple outstanding requests. As a result, applications which are designed for a synchronous network system are much simpler and easier to develop.

Such applications communicate with the unique synchronous interface to initiate a synchronous transaction. The unique synchronous interface performs the tasks necessary to emulate the synchronous transaction process while actually performing a transaction on an asynchronous network.

Figure 1:
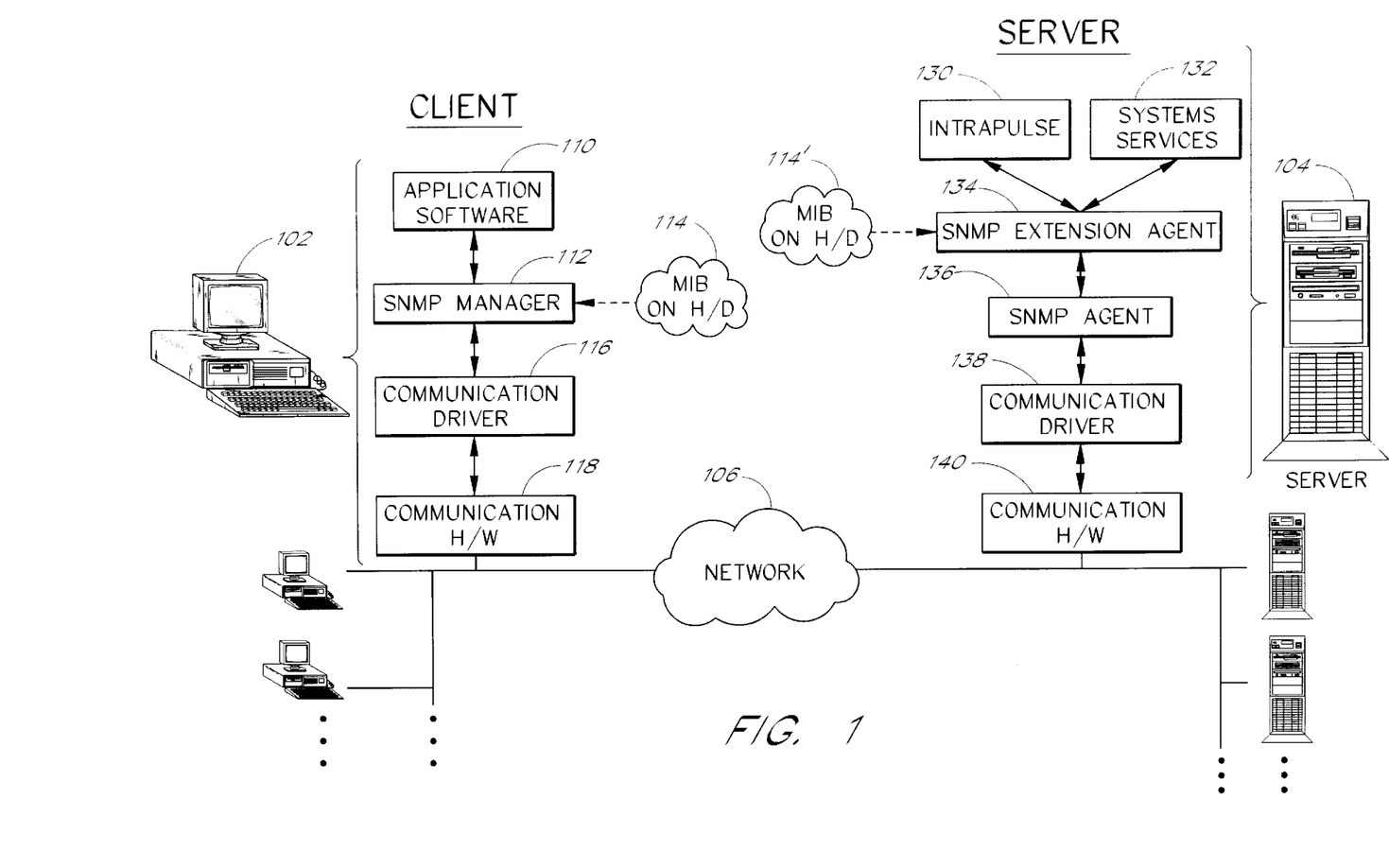
FIG. 1 illustrates a block diagram of a computer network appropriate for use with one embodiment of the invention.

To facilitate a complete understanding of the invention, the remainder of the detailed description is arranged with the following sections and subsections:

I. Architectural Overview
II. The Synchronous Communication Interface
III. The Synchronous Emulation Process
 A. Operation Of The Task Loop
 B. Timer Operation
 C. Retry Query Operation
IV. Exemplarary Advantages
V. Conclusion I. Architectural Overview FIG. 1 illustrates an architectural overview of a computer system 100 appropriate for use with one embodiment of the present invention. The computer system 100 includes one or more client computer(s) 102 and one or more server computer(s) 104 connected by at least one network 106. In one embodiment of the invention, the client and server computers 102 and 104 are multi-processor Pentium-based computers having 256 megabytes or more of RAM. It will be apparent to those of ordinary skill in the art, however, that the client and server computers 102 and 104 may be any conventional general purpose single- or multi-chip microprocessor such as a Pentium processor, a Pentium Pro processor, aa 8051 processor, a MIPS processor, a Power PC processor, an ALPHA processor, etc.

The network 106 can be implemented as a wide area network ("WAN") or a local area network ("LAN"). The network 106 allows client users (i.e., users of the client computers 102) dispersed over a geographic area to access the server computers 104. In one embodiment, the network 106 is implemented with a standardized communication protocol known as the Simple Network Management Protocol ("SNMP"). SNMP is explained in more detail in *The Simple Book* by Marshall T. Rose, 2d ed, Prentice-Hall, Inc., 1994, which is hereby incorporated herein by reference. The SNMP acts as a mechanism to provide and transport management information between different network components.

SNMP uses a transport protocol stack such as the User Datagram Protocol/Internet Protocol ("UDP/IP") or the Transmission Control Protocol/Internet Protocol ("TCP/

IP"). UDP/IP provides connectionless communication and is part of the TCP/IP suite. UDP/IP operates at the transport layer, and in contrast to TCP/IP, does not guarantee the delivery of data. TCP/IP is a standard Internet protocol (or set of protocols) which specifies how two computers exchange data over the Internet. TCP/IP handles issues such as packetization, packet addressing, handshaking and error correction. For more information on TCP/IP, see Volumes I, II and III of Comer and Stevens, Internetworking with TCP/IP, Prentice Hall, Inc., ISBNs 0-13-468505-9 (vol. I), 0-13-125527-4 (vol. II), and 0-13-474222-2 (vol. III).

The SNMP system as provided by NetFRAME Systems Incorporated of Milpitas, includes a number of modules. In the following description, a module includes, but is not limited to, software or hardware components which perform certain tasks. Thus, a module may include object-oriented software components, class components, methods, functions, attributes, procedures, subroutines, segments of program code, drivers, firmware, microcode, circuitry, data, data structures, tables, arrays, variables, etc. A module may also mean a published report by a group of experts defining objects for a particular area of technology such as RFC 1213, *Management Information Base for Network Management of TCP/IP-based Internets: MIB-II*. While the modules in one embodiment of the invention comprise object-oriented C++ computer code, the invention contemplates the use of other computer languages.

The modules in the client computer 102 include an application module 110, an SNMP module 112, a MIB module 114, a communication driver module 116 and communication hardware 118. The SNMP module 112 sends requests to, and receives responses from the server computers 104. As discussed in further detail below, in one embodiment, the SNMP module 112 also provides synchronous communication emulation.

The MIB module 114 defines the format and content of the variables associated with the SNMP network 106. The MIB definitions are commonly contained within a conventional text file having ASCII format which is stored on a computer hard drive. Additional information regarding MIBs is available in *Managing Internetworks* with SNMP by Mark A. Miller, M&T Books, 1993, which is hereby incorporated herein by reference.

The SNMP system also utilizes the communication driver modules 116 and the computer hardware 118 to transmit messages to the network 106. The communication driver modules 116 are modules which provide an interface between other software modules and the communication hardware 118. The communication driver modules 116 provide information regarding the communication hardware 118, and provides means to interface with the communication hardware 118. The communication hardware 118 may include various network adapters which interact with network media such as Ethernet (IEEE 802.3), Token Ring (IEEE 802.5), Fiber Distributed Datalink Interface (FDDI) or Asynchronous Transfer Mode (ATM). In one embodiment, the high speed communication channels, communication busses and controllers in the communication hardware 118, are all provided in pairs. If one of should fail, another channel, communication bus or controller is available for use.

The SNMP system on the server computers 104, on the other hand, includes an intrapulse module 130, a systems services module 132, an SNMP extension agent module 134, the MIB module 114, an SNMP agent module 136, communication driver modules 138 and communication hardware 140. The Intrapulse module 130 is a product from NetFrame Systems, Inc., which continuously monitors and manages the physical environment of the server computers 104. Likewise, the system services module 132 is a software/hardware interface with provides information regarding the server computers 104 to the SNMP extension agent module 134. Other hardware monitoring systems, however, are fully contemplated for use with the invention described herein.

The SNMP extension agent module 134 provides communication interface services for communication between the SNMP agent module 136 and the Intrapulse module 130 and system services module 132. For example, if the SNMP agent module 136 does not recognize a particular request, then the request is forwarded to the SNMP extension agent module 134.

The SNMP agent module 136 is a process which executes on a server computer 104. The SNMP agent module 136 responds to requests from the client computers 102. The SNMP agent module 136 is a standard module and is part of the SNMP network standard.

Like the communication driver modules 116 and the communication hardware 118 in the client computer 102, the communication driver modules 138 and communication hardware 140 in the server computers 104 transmit messages on the network 106. The communication driver modules 138 provide information regarding the communication hardware 140, and provide a means to interface with the communication hardware 140. The communication hardware 140 may include various network adapters which interact with network media such as Ethernet (IEEE 802.3), Token Ring (IEEE 802.5), Fiber Distributed Datalink Interface ("FDDI") or Asynchronous Transfer Mode ("ATM").

The request messages generated by the application module 110 on the client computer 102 are processed by the SNMP module 112 and then forwarded to the SNMP agent module 136 on the server computer 104. The modules 136, 134, 130 and 132 on the server computer 104 process the request messages and send response messages back to the client computer 102.

II. The Synchronous Communication Interface

Figure 2:
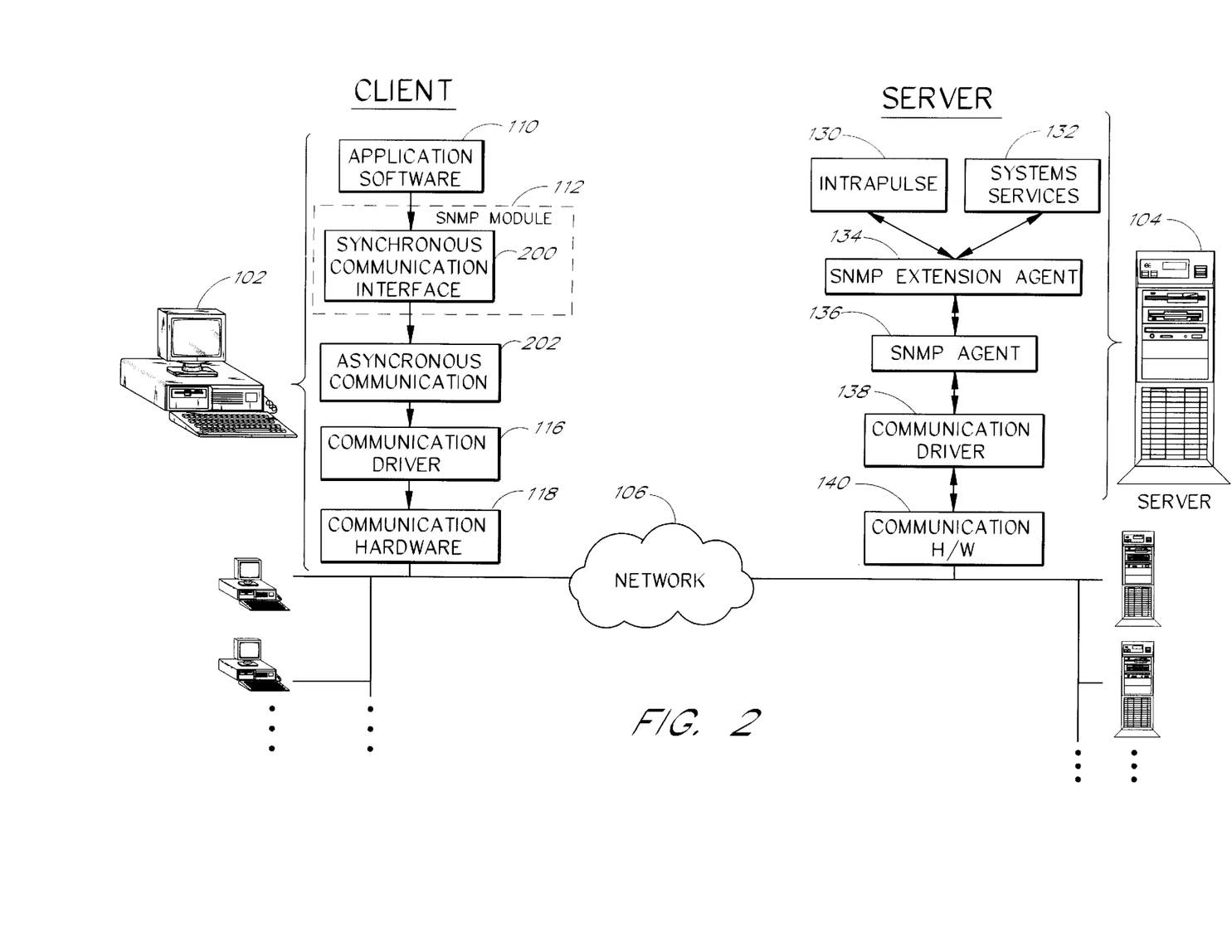
FIG. 2 illustrates a high-level block diagram of the modules in one embodiment of the present invention.

FIG. 2 illustrates a conceptional view of the operation of the SNMP module 112. The SNMP module 112 conceptionally provides a synchronous communication interface 200 while supporting the asynchronous communication 202 of the SNMP network 106. The synchronous communication interface 200 appears to transform certain asynchronous data gathering operations of the SNMP module 112, into synchronous communication operations. The asynchronous communication block 318 then operates to provide asynchronous communication on the SNMP system.

The synchronous communication interface 200 allows the application module 110 on the client computer 102 to generate synchronous requests. These synchronous requests are then converted into asynchronous requests.

For example, the application module 110 can send data requests to the SNMP module 112 using standard synchronous communication techniques. The SNMP manger module 112 then obtains the desired data from the server computer 104 via asynchronous communication 202. Once the SNMP module 112 obtains the desired data from the server computer 104, the SNMP module 112 forwards the desired data in a synchronous manner back to the application module 110. While one embodiment implements the synchronous interface 200 into the SNMP module 112, the synchronous interface 200 could be incorporated into the applications module 110.

In one embodiment, the application module 110 includes network management software, however, it is contemplated that the application module would be any module which initiates a synchronous request. For example, an application module 110 for monitoring network components could make a synchronous request for information about a component such as a cooling fan. The SNMP module 112 then obtains the data about the cooling fan by initiating an asynchronous request on the network 106.

Furthermore, in one embodiment, the application modules 110 take advantage of multithreading. Multithreading, is a technique which allows the simultaneous execution of different tasks. Multithreading is a special form of multitasking in which tasks originate from the same process or program. Thus an application module 110 may simultaneous execute multiple tasks in different treads. Furthermore, other application modules 110 will execute in their assigned threads.

In one embodiment, each thread contains an SNMP module 112. Because the system instantiates a new SNMP module 112 for each new application thread, multiple SNMP modules 112 can exist at any given time. When the SNMP module 112 is instantiated it is assigned a unique identifier which is commonly referred to as a handle. Thus, one or more SNMP modules 112 provide the synchronous interfaces for multiple application modules 110.

Figure 3:
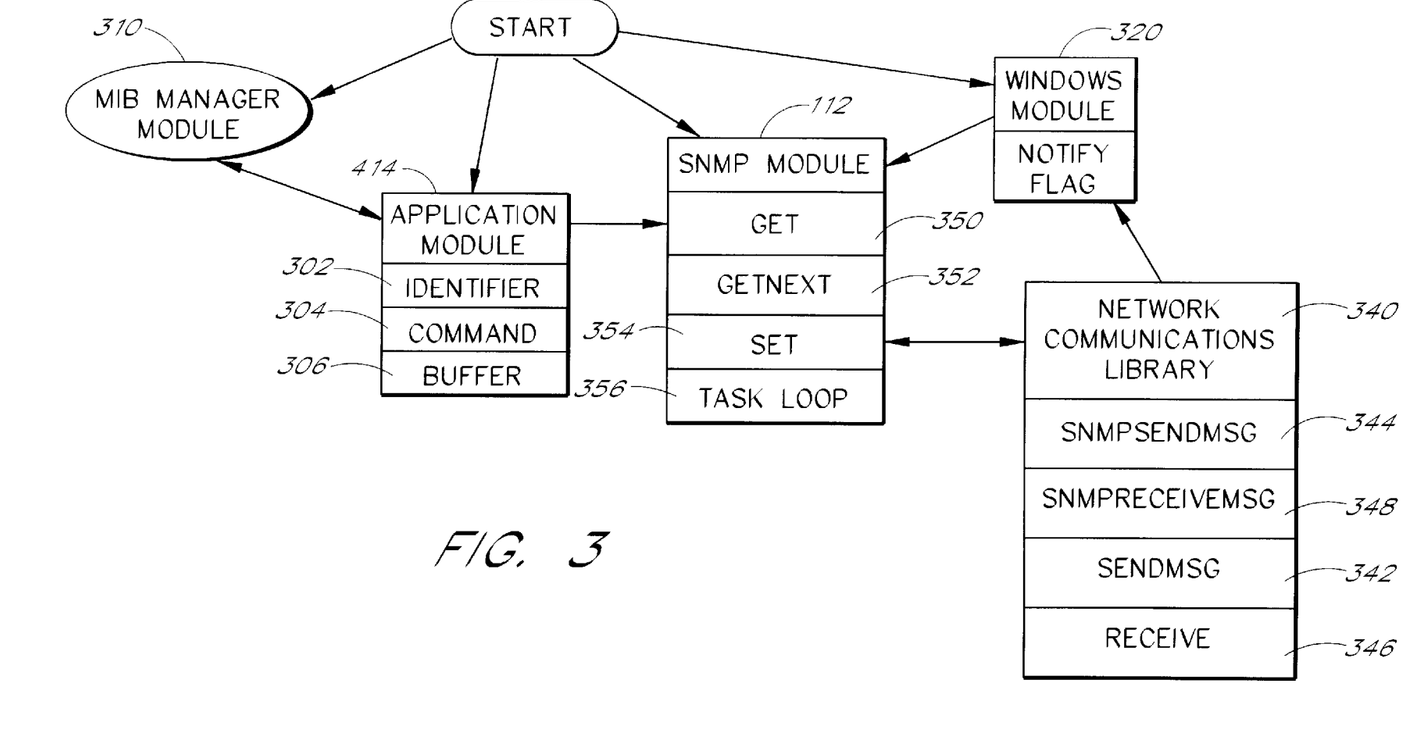
FIG. 3 illustrates the module-level architecture of one embodiment of the invention.

Additional detail regarding the structure of one embodiment of the modules in the client computer 102 is illustrated in FIG. 3. The start state 300 indicates that the SNMP system is operational. The SNMP system on the client computer 102 includes a variety of modules including a MIB manager module 310, the application module 110, a windows module 320 and a network communications library 340. In one embodiment, the SNMP system is Maestro Central from NetFrame Systems Inc. As described in more detail below, when the SNMP system is operational, the various modules communication with each other to send network messages to the server computer 104.

When initiating a synchronous request for data, the request includes an identifier 302, a command 304 and one or more buffer(s) 306. The identifier 302 in one embodiment uniquely identifies different network components. For example, the identifier 302 will identify components such as fans, slots, adapters, processors, power supplies, canisters, interface cards, memory, etc.

The command 304, in one embodiment, identifies the type of information to obtain about the identified component. For example, the command 304 can direct the server computer 104 to obtain data about a fan's speed, a fan's location, a temperature reading, a slot's power status, a slot's location, a slot's bus connection, an adapter's bus number, an adapter's vendor identification, whether an adapter supports hot plugability, a driver's name, a driver's version, a driver's type, a canister's location, a canister's name, a canister's serial number, a canister's power state, a power supply's status, a power supply's location, a CPU's clock frequency, a CPU's location or a voltage level at a particular point in a server, etc.

The buffer 306 is used to store the obtained data. Thus the buffer 306 can hold a wide variety of data structures including text, variables, tables, numerical values, flags, etc. Thus, requests by the application module 110 can include a wide variety of data types and values. Furthermore, the requests may include other commands 304 which may or may not include data values.

The MIB manager module 310 accesses the unique identifier 302 of each component in the server computers 104 stored in the Management Information Base ("MIB") data 114. When the application module 110 desires information about a particular component, the application module 110 requests the identifier 302 of the desired component from the MIB manager module 310. The MIB manager module 310, in turn, accesses the MIB data 114 and returns the desired identifier 302 to the application module 110.

The windows module 320 is used to pass messages among different modules. In one embodiment, the window module 206 is a standard Microsoft window for passing messages. The window module 206 includes a notify flag 322 which notifies the SNMP module 112 that the requested data has been received. If multiple SNMP modules 112 exist, the window module 206 contains notify flags 322 which identify each SNMP module 112.

The network communications library 340 in one embodiment of the invention is a standard WinSNMP Library. One such standard WinSNMP Library is distributed by ACE Communications. The network communications library 340 facilitates communication over the network 106 by providing a plurality of function calls. Relevant function calls include a SendMsg function 342, an SnmpSendMsg function 344, a Receive function 346 and an SnmpReceiveMsg function 348.

As explained in more detail below, the SendMsg function 342 determines whether the network 106 is functional. If so, the SendMsg function 342 executes the SnmpSendMsg function 344. The SnmpSendMsg function 344 uses standard routines to initiate an SNMP asynchronous request. The Receive function 346 determines whether data has been obtained. If so, the Receive function 346 executes the SnmpReceiveMsg function 348. The SnmpReceiveMsg function 348 executes standard routines to ensure that the obtained data is loaded in to the proper data buffer 306.

It is contemplated that the synchronous transaction interface described herein may operate with libraries other then the WinSNMP Library. The WinSNMP Library is but one of many libraries available which provide a standardized collection of asynchronous computer software functions. Similarly, the present synchronous transactions claimed herein need not obtain information from or operate in conjunction with such libraries. Other asynchronous software routines may be used.

Referring now to the SNMP module 112, the SNMP module 112 contains a number of methods (also called functions or routines) which support the synchronous interface 200. In an object-oriented environment, routines for performing various functions are commonly called methods. Throughout this detailed description the term method is used generally to refer software or hard components including functions, attributes, procedures, subroutines, segments of program code, drivers, firmware, microcode, circuitry, data, data structures, tables, arrays, variables, etc.

In one embodiment, the SNMP module 112 includes the GET method 350, the GETNEXT method 352, the SET method 354 and the Task Loop method 356. In other embodiments, the functionality of the GET method 350, the GETNEXT method 352, the SET method 354, and the Task Loop method 356 could be collectively or independently implemented in different modules. For example, the functionality of the GET method 350, the GETNEXT method 352, the SET method 354 or the Task Loop method 356 could be incorporated into the application module 110.

The GET method 350 is used to synchronously request the values of one or more data values. The GETNEXT method 352 synchronously sequentially obtains one ore more organized values, such as values in a table while the SET method 354 sets a component variable to a desired value. The Task Loop module 356 provides synchronous functionality. The Task Loop module 356 begins operation when the application module 110 invokes the GET method 350, the GET-NEXT method 352 or the SET method 354.

As described in additional detail below, the Task Loop module 356 includes a timer which monitors the time duration required to obtain a response from the server computer 104. If a predetermined time duration is exceeded, the Task Loop module 356 responds that the requested data is unavailable. In one embodiment, the Task Loop module 356 also re-executes requests which have exceeded the desired time limit.

III. The Synchronous Emulation Process

Figure 4:
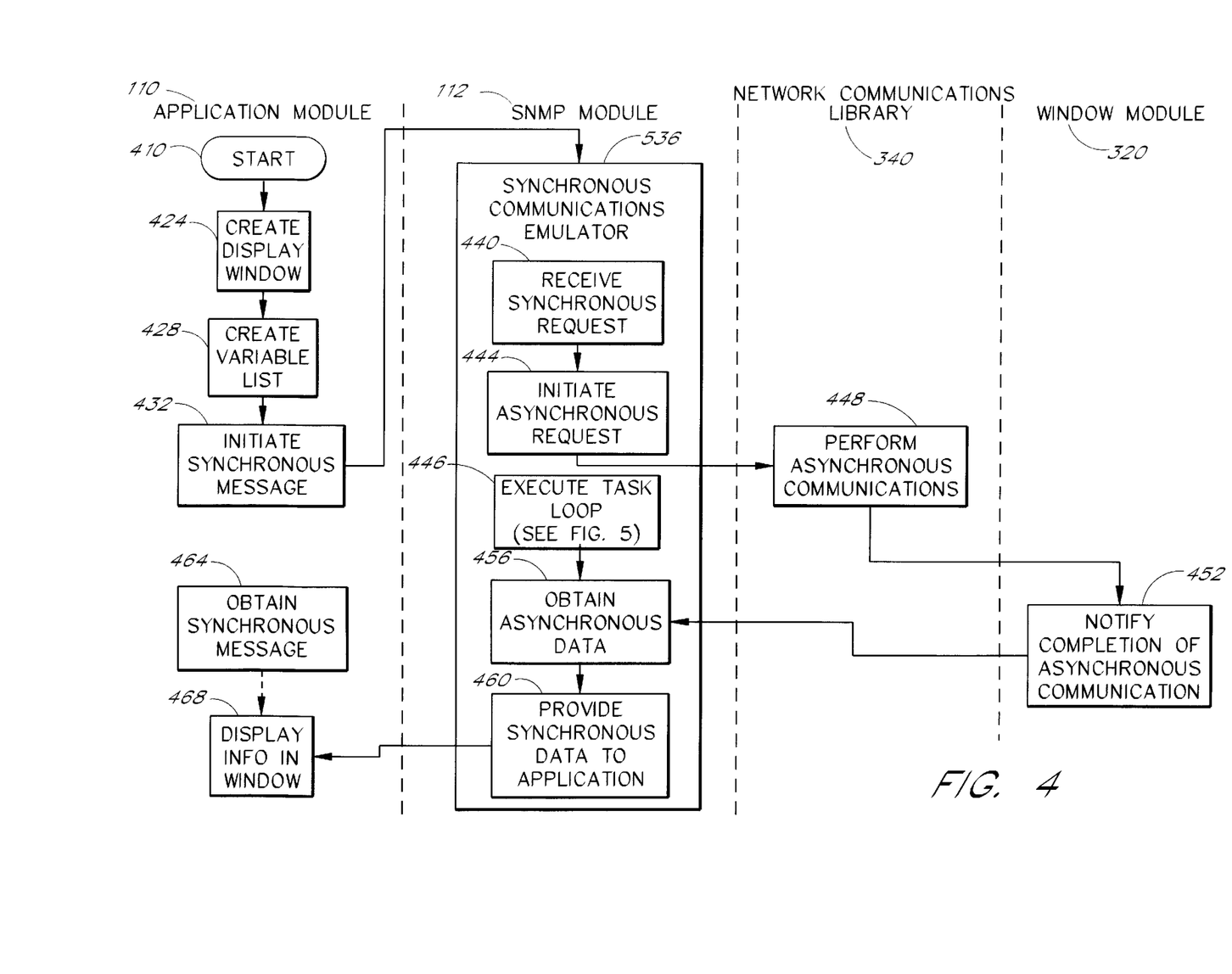
FIG. 4 illustrates a flow chart of the synchronous emulation process in one embodiment of the invention.

FIG. 4 illustrates a flow chart of one embodiment of the synchronous emulation process. FIG. 4 is divided into four sections to more clearly delineate the operation and interaction of each module of the disclosed embodiment. In particular, FIG. 4 is divided vertically from left to right to display the operation of the application module 110, the SNMP module 112, the network communications library 340, and the windows module 320.

Beginning in a start state 410, the application module 110 is invoked and begins an execution thread. Furthermore, an SNMP module 112 is also created. If other application modules 110 are invoked, additional SNMP modules 112 are also created. Each SNMP module 112 is assigned its own handle.

For illustrative purposes, the process states of an exemplary application module 110 are shown. In this example, the application module 110 displays a number of data values about the operation of the server computers 104 on the screen of the client computer 102. Proceeding to state 524, the application module 110 creates a display window on the screen of the client computer 102.

For example, assume that the application module 110 desires to display the operational status of a server fan. In state 410, the application module 110 creates a window for displaying the status of the server fan.

Proceeding to state 428, application module 110 initiates a request for data. To generate the request, the application module 110 creates a variable identifier list. The application module 110 obtains the desired identifiers 302 from the MIB manager module 310 and allocates the data buffer 306 for storing the desired data.

For example, if the application module 110 desires to obtain the status of a server fan, in state 428, the application module 110 obtains the identifier 302 of the server fan from the MIB manager module 310. While in state 428, the application module 110 also allocates a data buffer 306 which will be used to store the data regarding the server fan.

Proceeding to state 432, the application module 110 initiates a synchronous information request. In one embodiment, the application module 110 initiates the synchronous information request by calling the GET method 350, the GETNEXT method 352 or the SET method 354 in the SNMP module 112. While only one GET, GETNEXT or SET method 350, 352 or 354 is called at any given time, the methods 350, 352 and 354 perform similar functions and are discussed collectively throughout this detailed description.

When calling either the GET, GETNEXT or SET method 350, 352 or 354, the application module 110 passes 1) the desired identifier(s) 302, 2) the desired command 304 and 3) a pointer to the allocated data buffer 306. For example, if the application module 110 wishes to obtain the status of a server fan, the application module 110 synchronously calls the GET method 350 and passes a fan identifier 302, a fan status request command 304 and a pointer to a fan buffer 306. If the application module 110 desires to obtain the status of a server fan and the status of a server power supply, the application module 110 synchronously calls the GET method 350 and passes a fan identifier 302, a power supply identifier 302, a fan status request command 304, a power supply status command 304, a pointer to a fan buffer 306 and a pointer to a power supply buffer 306. The application module 110 then suspends execution until the application module 110 receives a response containing all of the requested data.

Proceeding to state 440, the SNMP module 112 executes the synchronous request from the applications module 110. That is, the SNMP module 112 executes the GET, GETNEXT or SET method 350, 352 or 354. In the server fan example mentioned above, the SNMP module 112 executes the GET method 350.

Proceeding to state 444, the GET, GETNEXT or SET method 350, 352 or 354 initiates an asynchronous request. In one embodiment, the methods 350, 352 or 354 execute the SendMsg function 342 in the network communications library 340. When executing the SendMsg function 342, the methods 350, 352 or 354 pass the handle of the SNMP module 112, the identifier 302, the command 304 and the pointer to the data buffer 306. The SendMsg function 342 then queries the network 106 and identifies whether the network 106 is operational.

In the server fan example, the GET method 350 executes the SendMsg function 342. When executing the SendMsg function 342, the GET method 350 passes the handle of the SNMP module 112, the identifier 302 of the fan, fan status command 304 and the fan buffer 306.

When multiple data values are requested, such as information about the fan and information about the power supply, the GET method 350 passes the handle of the SNMP module 112, the corresponding identifiers 302, commands 304 and buffers 306 to the SendMsg function 342.

Proceeding to state 448, if the network 106 is operational, the SendMsg function 342 executes the SnmpSendMsg function 344 existing in the network communications library 340. When the SendMsg function 342 executes the SnmpSendMsg function 344, it passes the identifier 302, the command 304 and the pointer to the data buffer 306. The SnmpSendMsg function 344 then performs an asynchronous transaction on the network 106. If multiple data values are requested the SnmpSendMsg function 344 generates an asynchronous request for multiple data values.

In the server fan example, the SendMsg function 342 executes the SnmpSendMsg function 344 and passes to the SnmpSendMsg function 344, the handle of the SNMP module 112, the fan identifier 302, the fan status command 304 and the pointer to the fan buffer 306.

Referring now to state 446, the Task Loop module 356 monitors the time needed to obtain a response from the server computer 104. The Task Loop module 356 is further described in the section entitled "The Operation Of the Task Loop Module." In the server fan example, the Task Loop module 356 monitors the time needed to obtain the requested fan status data.

Proceeding to state 452, when the requested information returns from the server computer 104, the SnmpSendMsg function 344 uses the handle of the SNMP module 112 to set the notify flag 322 in the windows module 320 indicating that the requested data for that SNMP module 112 has been obtained. When the notify flag 322 is set, the windows module 320, in turn, notifies the identified SNMP module 112 that the data has been obtained. Thus, windows module 320 identifies the proper SNMP module 112 which initiated a particular request.

In the server fan example, when the fan status data is obtained, the SnmpSendMsg function 344 uses the handle of the SNMP module 112 to set the proper notify flag 322 in the windows module 320. The windows module 320, in turn, notifies the identified SNMP module 112 that the fan data has been obtained. Thus the windows module 320 can provide notification to multiple SNMP modules 112.

In another embodiment, instead of setting a notification flag in the windows module 320, the SnmpSendMsg function 344 sets a task complete indicator. The Task Loop module 356 may monitor the task complete indicator to determine when to execute the SnmpReceiveMsg function 348 to thereby retrieve the data from the network communications library 340.

Proceeding to state 456, the SNMP module 112 obtains the data using the SnmpReceiveMsg function 348. The SnmpReceiveMsg function 348 transfers the data to the data buffer 306. The SnmpReceiveMsg function 348 then transfers the pointer to the data buffer 306 back to the SNMP module 112. In the server fan example, the SnmpReceiveMsg function 348 transfers the requested fan information to the fan buffer 306. A pointer to the fan buffer 306 is then transferred back to the SNMP module 112.

Proceeding to state 460, the SNMP module 112 then forwards the data buffer 306 back to the application module 110. In our server fan example, the GET method 350 returns the pointer to the fan buffer 306 back to the application module 110. Proceeding to state 464, the application module 110 can now continue execution. In this example, the application module 110 proceeds to state 468 and displays the data in the fan buffer 306 in a window on the client computer 102.

A. Operation Of The Task Loop

Figure 5:
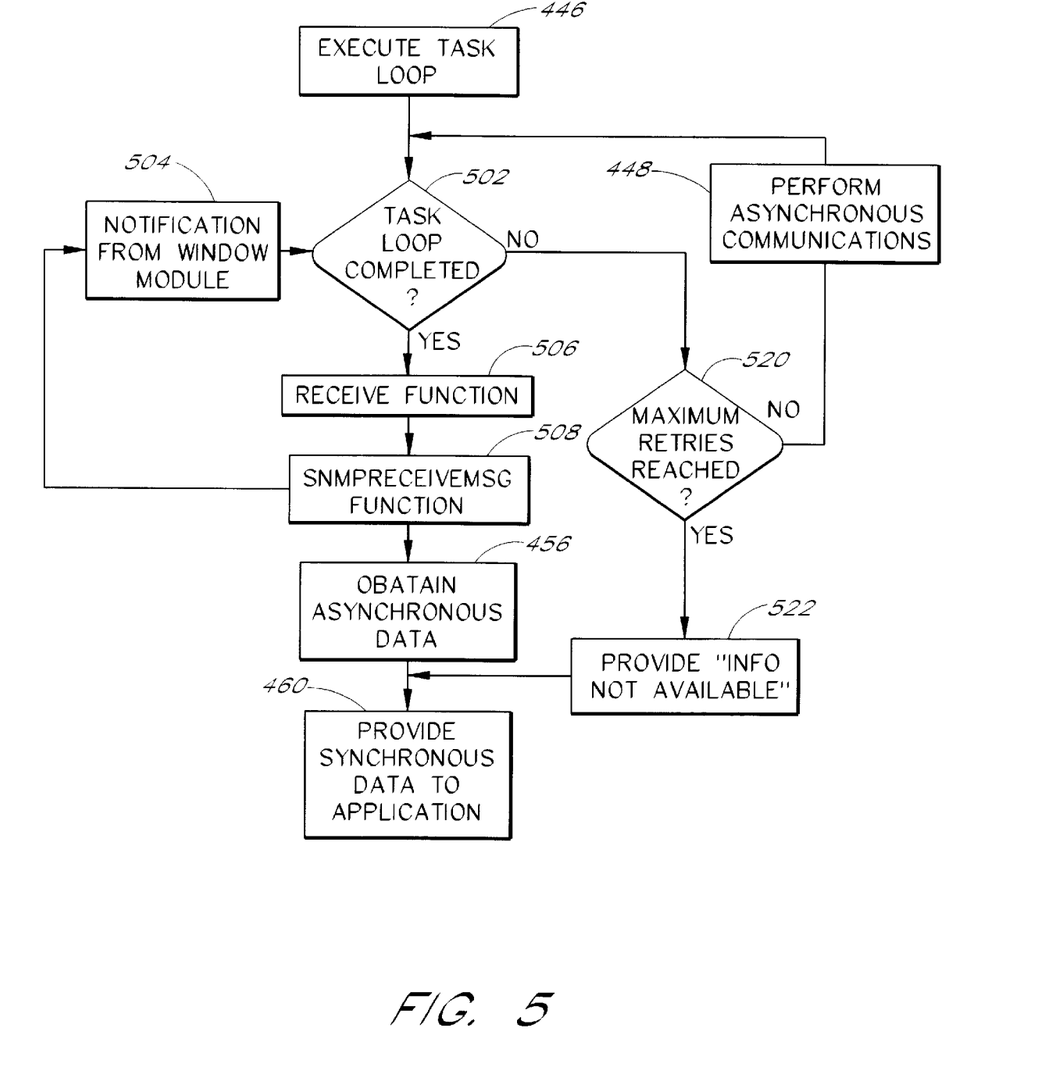
FIG. 5 illustrates a detailed flow chart of the synchronous emulation process in one embodiment of the invention.

FIG. 5 illustrates a flow chart of one embodiment of the Task Loop module 356 existing within the SNMP module 112. The Task Loop module 356 emulates a feature of a synchronous network system by ensuring that a request is completed within a maximum time duration. If the request is not complete within the maximum time duration, the Task Loop module 356 notifies the application module 110 that the desired data is not available.

Beginning in state 446, the Task Loop module 356 proceeds to state 502. In state 502, the Task Loop module 356 monitors the time duration needed to obtain a response to the asynchronous transaction. In one embodiment, the Task Loop module 356 monitors the time duration with a timer. The timer is designed to count to a maximum time duration. After reaching the maximum duration, the Task Loop module 356 is said to have "timed out." For example, if a request for data about the operation of a server fan is sent with the SnmpSendMsg function 344, the Task Loop module 356 monitors the duration needed to obtain the data about the fan. If the time to obtain the fan data exceeds a set time limit, the Task Loop module 356 notifies the application module 110 that the fan data is not available.

If the data from the server computer 104 is obtained prior to reaching the maximum time duration, the SNMP module 112 proceeds to state 506. In state 506, the GET, the GETNEXT or the SET method 350, 352, or 354 call the Receive function 346 in the network communications library 340. When calling the Receive function 346, the GET, the GET NEXT or the SET method 350, 352, or 354 pass the handle of their SNMP module 112 to the network communications library 340. The Receive function 346, in turn, passes the handle to the SNMP module 112 to the SnmpReceiveMsg function 348. The received data exists in the data buffer 306 and the SnmpReceiveMsg function 348 returns the data buffer 306 back to the GET, GETNEXT or SET method 350, 352 or 354.

For example, if the GET method 350 initiated the SnmpSendMsg function 344 to obtain the data about a server fan, upon notification, the GET method 350 calls the Receive function 346 and passes the handle of its SNMP module 112. The Receive function 346, in turn, passes the handle of the SNMP module 112 to the SnmpReceiveMsg function 348. The SnmpReceiveMsg function 348 then uses the handle to passes a pointer to the fan data buffer 306 back to the GET method 350.

Proceeding to state 456, the GET, GETNEXT or SET method 350, 352 or 354 have now obtained the requested data. Proceeding to state 460, the GET, GETNEXT or SET method 350, 352 or 354 return the pointer to the filled data buffer 306 to the application module 110.

For example, when the GET method 350 obtains the pointer to the fan buffer 306, the GET method 350 passes the pointer back to the application module 110. The application module 110 can then resume operation and access the fan data in the fan data buffer 306.

B. Timer Operation

One aspect of emulating a synchronous transaction includes monitoring the duration required to process an asynchronous request. In an asynchronous system, at the time an asynchronous request is initiated, it is not known how long it will take to obtain a response. In many synchronous systems, however, long delays create problems.

For example, in a synchronous system, after an application generates a request, the application suspends operation until the application obtains the desired response. If a response is not obtained in a timely manner, the application can appear to "hang." That is, the application may appear to have ceased functioning when the application suspends operation for an excessive amount of time.

One embodiment of the invention overcomes such "hang" problems by monitoring the time associated with obtaining an asynchronous response. When this embodiment has not received a response within a predefined time limit, this embodiment of the invention provides a response back to the client application that the requested data is unavailable. Providing a predefined time limit allows the application program to resume operation before it appears to "hang."

For example, assume that the application module 110 initiates a synchronous request for data. After initiating the request, the application module 110 suspends operation. In one embodiment, the synchronous interface 200 of the SNMP module 112, receives the synchronous request for data and initiates an asynchronous request on the network 106. In addition, the SNMP module 112 monitors the time duration of the pending synchronous request.

If a response is not received within a predetermined time duration, the SNMP module 112 notifies the suspended application that the response has not been received. This allows the application module 110 to resume operations. In such a situation, the application module 110 can communicate to the user that the desired data is not available.

Returning now to state 502, in some situations, the requested data will not be obtained within a desired time duration. The time duration in state 502, is set by a user. In one embodiment, the timer period may be set from 1 milliseconds to 20 seconds. In an alternative embodiment, the timer is set from 50 milliseconds to 10 seconds. In yet another embodiment, the timer is set at 5 seconds.

The timer operation is a software routine which will monitor the time until an event occurs. The timer operation can be configured to periodically or continuously monitor a flag or event. In one embodiment, the timer in state 502 awaits notification from the notification window in state 504. In an alternative embodiment, the timer continuously monitors the notification flag in the windows module 320.

If notification is not provided, that is, if the requested data is not obtained from the server computer 104, within the maximum time duration, the Task Loop module 356 proceeds to state 520.

C. The Retry Query Operation

In one embodiment, the SNMP module 112 also can re-executing failed requests. As explained above, in an asynchronous system some requests may take an excessive time to process. In addition, networking components may cease functioning and consequently fail to process certain requests.

To ensure that requests are properly processed, one embodiment of the SNMP module 112 re-executes failed or delayed requests. Furthermore, the number of repeated attempts can be selectively configured.

For example, assume that one embodiment of the SNMP module 112 is configured to re-execute failed requests two times. When the application module 110 generates a synchronous request, the SNMP module 112 will in turn, initiate an asynchronous request. If a response is not received within a desired time limit, the SNMP module 112 will execute another synchronous request. If, after the second time, a response has not been received, the SNMP module 112 will notify the application module 110 that the data is not available.

More particularly, in state 520, the Task Loop module 356 can attempt to resend an asynchronous request for data which has not been obtained within the maximum time duration. Thus, if data is not obtained within a desired time limit, the Task Loop module 356 can send another request for the data.

In state 520, the Task Loop module 356 counts the number of attempts to obtain the data (also called retry queries). Advantageously, the maximum retries value may be set by the network administrator or computer operator. In one embodiment, it is contemplated that the maximum number of retries may be set from 0 to 100. In another embodiment, the maximum number of retries may be set from 0 to 10. In yet another embodiment, the maximum number of retries is set at 2.

If the number of attempts does not exceed a maximum number, the Tasks Loop module 356 proceeds again to state 448 and re-executes the SendMsg function 342 and SnmpSendMsg function 344 thereby resubmitting another request to the server computer 104. The SendMsg function 342 and SnmpSendMsg function 344 cancel the previous pending request when initiating a new request.

For example, assume that the maximum number of retries is set to two. If a first request to obtain the fan data times out, the Task Loop module 356 re-initiates another request.

Returning to state 520, if the maximum number of retries is exceeded, the Task Loop module 356 proceeds to state 522. In state 522, the GET, GETNEXT or SET method 350, 352, or 354 send an "information not available" message to the application module 110. This allows the application module 110 to resume operation within a predetermined time limit when data is unavailable.

For example, if the second request to obtain fan data times out, the GET method 350 returns an "information not available" message to the application module 110. The application module 110 can then display to the user that the requested fan data is unavailable.

IV. Exemplarary Advantages

The unique synchronous interface allows the application module 110 to execute synchronous transactions in an asynchronous environment. Because the invention supports synchronous transactions, the complexity of the application module 110 is greatly reduced. The application module 110 does not need to monitor the status of multiple pending asynchronous transactions. Furthermore, the application module 110 does not need to match each request with its corresponding response.

This reduces errors, simplifies the development of new application modules 110, and simplifies the upgrading and modification of existing application modules 100. In addition, this allows programmers who are not skilled at monitoring asynchronous transactions, to create synchronous application modules 110. As can be appreciated, the synchronous interface decreases the costs and provides an incentive for third parties to develop application modules 110.

Advantageously, one embodiment of the invention provides synchronous support by providing a timer which monitors when an asynchronous transaction has exceeded a time limit. Such a timer allows the synchronous interface to provide a response to a synchronous request within a set time limit. As explained above, when the application module 110 initiates a synchronous transaction, the application module 110 may suspend execution. If the asynchronous transaction exceeds a certain amount of time, the application module 110 can appear to freeze or hang. Thus, the timer ensures that a long delay in processing a transaction will not suspend the application module 110 beyond a desired time duration.

Furthermore, one embodiment of the invention provides a retry query feature. The retry query feature allows a user to define the number of times to re-execute a data request. Thus, if a data request is not obtained within a desired time duration, the data request can be resent as many times as desired. If the data has not been obtained after repeated attempts, the application module 110 which initiated the data request can be notified that the data is unavailable.

Yet another advantage of one embodiment of the invention is that the application module 110 can rely on the orderly processing of data requests. In an asynchronous system, data requests are processed individually and thus the order of receiving the responses is not guaranteed. In contrast, the synchronous transactions in one embodiment of the invention, ensures that the responses to the data requests are obtained in an orderly manner.

V. Conclusion

While the above detailed description has shown, described and pointed out the fundamental novel features of the invention as applied to a preferred embodiment, it will be understood that various omissions, substitutions and changes in the form, and details of the illustrated device may be made by those skilled in the art without departing from the spirit of the invention. Consequently, the scope of the invention should not be limited to the foregoing discussion but should be defined by the appended claims.

Table A

Incorporation by Reference of Commonly Owned Applications

The following patent applications, commonly owned and filed Oct. 1, 1997, are hereby incorporated herein in their entirety by reference thereto:

TABLE A

| Title | Application No. | Attorney Docket No. |
|---|---|---|
| "System Architecture for Remote Access . . . and Control of Environmental Management" | 08/942,160 | MNFRAME.002A1 |
| "Method of Remote Access and Control of . . . Environmental Management" | 08/942,215 | MNFRAME.002A2 |
| "System for Independent Powering of . . . Diagnostic Processes on a Computer System" | 08/942,410 | MNFRAME.002A3 |
| "Method of Independent Powering of . . . Diagnostic Processes on a Computer System" | 08/942,320 | MNFRAME.002A4 |
| "Diagnostic and Managing Distributed . . . Processor System" | 08/942,402 | MNFRAME.005A1 |
| "Method for Managing a Distributed . . . Processor System" | 08/942,448 | MNFRAME.005A2 |
| "System for Mapping Environmental . . . Resources to Memory for Program Access" | 08/942,222 | MNFRAME.005A3 |
| "Method for Mapping Environmental . . . Resources to Memory for Program Access" | 08/942,214 | MNFRAME.005A4 |
| "Hot Add of Devices Software . . . Architecture" | 08/942,309 | MNFRAME.006A1 |
| "Method for The Hot Add of Devices" . . . | 08/942,306 | MNFRAME.006A2 |
| "Hot Swap of Devices Software . . . Architecture" | 08/942,311 | MNFRAME.006A3 |
| "Method for The Hot Swap of Devices" . . . | 08/942,457 | MNFRAME.006A4 |
| "Method for the Hot Add of a Network . . . Adapter on a System Including a Dynamically Loaded Adapter Driver" | 08/943,072 | MNFRAME.006A5 |
| "Method for the Hot Add of a Mass . . . Storage Adapter on a System Including a Statically Loaded Adapter Driver" | 08/942,069 | MNFRAME.006A6 |
| "Method for the Hot Add of a Network . . . Adapter on a System Including a Statically Loaded Adapter Driver" | 08/942,465 | MNFRAME.006A7 |
| "Method for the Hot Add of a Mass . . . Storage Adapter on a System Including a Dynamically Loaded Adapter Driver" | 08/962,963 | MNFRAME.006A8 |
| "Method for the Hot Swap of a Network . . . Adapter on a System Including a Dynamically Loaded Adapter Driver" | 08/943,078 | MNFRAME.006A9 |
| "Method for the Hot Swap of a Mass . . . Storage Adapter on a System Including a Statically Loaded Adapter Driver" | 08/942,336 | MNFRAME.006A10 |
| "Method for the Hot Swap of a Network . . . Adapter on a System Including a Statically Loaded Adapter Driver" | 08/942,459 | MNFRAME.006A11 |
| "Method for the Hot Swap of a Mass . . . Storage Adapter on a System Including a Dynamically Loaded Adapter Driver" | 08/942,458 | MNFRAME.006A12 |
| "Method of Performing an Extensive . . . Diagnostic Test in Conjunction with a BIOS Test Routine" | 08/942,463 | MNFRAME.008A |
| "Apparatus for Performing an Extensive . . . Diagnostic Test in Conjunction with a BIOS Test Routine" | 08/942,163 | MNFRAME.009A |
| "Configuration Management Method for . . . Hot Adding and Hot Replacing Devices" | 08/941,268 | MNFRAME.010A |
| "Configuration Management System for . . . Hot Adding and Hot Replacing Devices" | 08/942,408 | MNFRAME.011A |
| "Apparatus for Interfacing Buses" . . . | 08/942,382 | MNFRAME.012A |
| "Method for Interfacing Buses" . . . | 08/942,413 | MNFRAME.013A |
| "Computer Fan Speed Control Device" . . . | 08/942,447 | MNFRAME.016A |
| "Computer Fan Speed Control Method" . . . | 08/942,216 | MNFRAME.017A |
| "System for Powering Up and Powering . . . Down a Server" | 08/943,076 | MNFRAME.018A |
| "Method of Powering Up and Powering . . . Down a Server" | 08/943,077 | MNFRAME.019A |
| "System for Resetting a Server" . . . | 08/942,333 | MNFRAME.020A |
| "Method of Resetting a Server" . . . | 08/942,405 | MNFRAME.021A |
| "System for Displaying Flight Recorder" . . . | 08/942,070 | MNFRAME.022A |
| "Method of Displaying Flight Recorder" . . . | 08/942,068 | MNFRAME.023A |
| "Synchronous Communication Interface" . . . | 08/943,355 | MNFRAME.024A |
| "Software System Facilitating the . . . Replacement or Insertion of Devices in a Computer System" | 08/942,317 | MNFRAME.026A |

TABLE A-continued

| Title | Application No. | Attorney Docket No. |
|---|---|---|
| "Method for Facilitating the Replacement . . . or Insertion of Devices in a Computer System" | 08/942,316 | MNFRAME.027A |
| "System Management Graphical User . . . Interface" | 08/943,357 | MNFRAME.028A |
| "Display of System Information" . . . | 08/942,195 | MNFRAME.029A |
| "Data Management System Supporting Hot . . . Plug Operations on a Computer" | 08/942,129 | MNFRAME.030A |
| "Data Management Method Supporting . . . Hot Plug Operations on a Computer" | 08/942,124 | MNFRAME.031A |
| "Alert Configurator and Manager" . . . | 08/942,005 | MNFRAME.032A |
| "Managing Computer System Alerts" . . . | 08/943,356 | MNFRAME.033A |
| "Computer Fan Speed Control System" . . . | 08/940,301 | MNFRAME.034A |
| "Computer Fan Speed Control System . . . Method" | 08/941,267 | MNFRAME.035A |
| "Black Box Recorder for Information . . . System Events" | 08/942,381 | MNFRAME.036A |
| "Method of Recording Information System . . . Events" | 08/942,164 | MNFRAME.037A |
| "Method for Automatically Reporting a . . . System Failure in a Server" | 08/942,168 | MNFRAME.040A |
| "System for Automatically Reporting a . . . System Failure in a Server" | 08/942,384 | MNFRAME.041A |
| "Expansion of PCI Bus Loading Capacity" . . . | 08/942,404 | MNFRAME.042A |
| "Method for Expanding PCI Bus Loading . . . Capacity" | 08/942,223 | MNFRAME.043A |
| "System for Displaying System Status" . . . | 08/942,347 | MNFRAME.044A |
| "Method of Displaying System Status" . . . | 08/942,071 | MNFRAME.045A |
| "Fault Tolerant Computer System" . . . | 08/942,194 | MNFRAME.046A |
| "Method for Hot Swapping of Network . . . Components" | 08/943,044 | MNFRAME.047A |
| "A Method for Communicating a Software . . . Generated Pulse Waveform Between Two Servers in a Network" | 08/942,221 | MNFRAME.048A |
| "A System for Communicating a Software . . . Generated Pulse Waveform Between Two Servers in a Network" | 08/942,409 | MNFRAME.049A |
| "Method for Clustering Software . . . Applications" | 08/942,318 | MNFRAME.050A |
| "System for Clustering Software . . . Applications" | 08/942,411 | MNFRAME.051A |
| "Method for Automatically Configuring a . . . Server after Hot Add of a Device" | 08/942,319 | MNFRAME.052A |
| "System for Automatically Configuring a . . . Server after Hot Add of a Device" | 08/942,331 | MNFRAME.053A |
| "Method of Automatically Configuring and . . . Formatting a Computer System and Installing Software" | 08/942,412 | MNFRAME.054A |
| "System for Automatically Configuring . . . and Formatting a Computer System and Installing Software" | 08/941,955 | MNFRAME.055A |
| "Determining Slot Numbers in a . . . Computer" | 08/942,462 | MNFRAME.056A |
| "System for Detecting Errors in a Network" . . . | 08/942,169 | MNFRAME.058A |
| "Method of Detecting Errors in a Network" . . . | 08/940,302 | MNFRAME.059A |
| "System for Detecting Network Errors" . . . | 08/942,407 | MNFRAME.060A |
| "Method of Detecting Network Errors" . . . | 08/942,573 | MNFRAME.061A |

What is claimed is:

1. A method of providing emulation of a synchronous transaction in an asynchronous communication system comprising the acts of:
   in an emulation module:
      receiving a request to provide data synchronously;
      passing said request to a communication routine;
      waiting for notification from said communication routine;
   in said communication routine;
      obtaining the requested data asynchronously;
      storing said data in a memory;
      providing notification to said module when the requested data is available;
   in the emulation module:
      requesting said communication routine to provide said data or a pointer to said data in the memory after receiving said notification; and,
      responding to said request synchronously.

2. The method of claim 1, wherein providing emulation of a synchronous transaction comprises making a single request for all of one or more items of data and obtaining all of said one or more items of data in a single response.

3. The method of claim 1, wherein said providing notification comprises said communication routine setting a flag in a window module after which said window module provides notification to said module.

4. The method of claim 1, wherein responding to said request comprises providing to an application module all of one or more items of data or a pointer to all of one or more items of data.

5. The method of claim 1, wherein said passes said request to a communication routine comprises configuring said request for a function call, said function call obtaining the requested data from software on a server computer.

6. The method of claim 1, wherein waiting for notification comprises blocking the operation of said application module which made said request.

7. The method of claim 1, wherein said module operates using Simple Network Management Protocol.

8. A method of emulating a synchronous transaction with an application module, the method comprising:

executing a request to an SNMP module for data wherein said data is to be provided to said application module synchronously;

forwarding said request to a library;

monitoring said library for an indication that all of said request is complete;

directing said library to obtain and store in memory all of said data, said library further providing notice to said SNMP module when all of said data is available; and, providing all of said data to said application module after said SNMP module receives said notice from said library.

9. The method of claim 8, wherein for a synchronous transaction said application module is blocked from further operation until the return of said data.

10. The method of claim 8, wherein said directing said library comprises using at least one of a GET, GETNEXT, or SET commands.

11. The method of claim 8, wherein said library comprises a WinSNMP Library.

12. A method of emulating a synchronous transaction in an asynchronous communication system, the method comprising:

programming an application for use in the asynchronous communication system;

preparing at least one request for data routine in said application, the routine being configured to request the data across a network synchronously; and storing the data in a memory until all of the data is received.

* * * * *

UNITED STATES PATENT AND TRADEMARK OFFICE
CERTIFICATE OF CORRECTION

PATENT NO. : 6,068,661
DATED : May 30, 2000
INVENTOR(S) : Srikumar N. Chari

It is certified that error appears in the above-identified patent and that said Letters Patent is hereby corrected as shown below:

Title page,
Item [75], Inventor:, "Shari" should be -- Chari --

Signed and Sealed this

Twenty-fifth Day of December, 2001

Attest:

Attesting Officer

JAMES E. ROGAN
*Director of the United States Patent and Trademark Office*